United States Patent
Butler et al.

(10) Patent No.: US 9,389,844 B2
(45) Date of Patent: Jul. 12, 2016

(54) SOLUTION FOR A COMPUTER SYSTEM

(75) Inventors: Nicholas D. Butler, Romsey (GB);
Christine M. Draper, Basingstoke (GB); John W. Sweitzer, Austin, TX (US); Marcello Vitaletti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 2088 days.

(21) Appl. No.: 10/963,138

(22) Filed: Oct. 12, 2004

(65) Prior Publication Data
US 2005/0108181 A1    May 19, 2005

(30) Foreign Application Priority Data
Nov. 15, 2003  (GB) .................................. 0326668.1

(51) Int. Cl.
*G06F 9/44*   (2006.01)
*G06F 9/445*  (2006.01)

(52) U.S. Cl.
CPC .......................................... *G06F 8/61* (2013.01)

(58) Field of Classification Search
CPC ............... G06F 8/70; G06F 8/71; G06F 8/36; G06F 8/30; G06F 8/60
USPC .............. 717/120, 168, 174; 706/46; 707/102
See application file for complete search history.

(56) References Cited

U.S. PATENT DOCUMENTS

| | | | |
|---|---|---|---|
| 5,455,775 A | 10/1995 | Huber et al. | |
| 6,327,551 B1 * | 12/2001 | Peterson et al. | ................... 703/1 |
| 7,069,541 B2 | 6/2006 | Dougherty et al. | |
| 7,072,900 B2 * | 7/2006 | Sweitzer et al. | |
| 7,103,874 B2 | 9/2006 | McCollum et al. | |
| 7,174,540 B2 | 2/2007 | Ondrusek et al. | |
| 7,203,937 B1 | 4/2007 | Kyle et al. | |
| 7,296,028 B1 | 11/2007 | Ivanova | |
| 2002/0087734 A1 | 7/2002 | Marshall et al. | |
| 2002/0104071 A1 | 8/2002 | Charisius et al. | |

FOREIGN PATENT DOCUMENTS

GB          0326668.1       * 11/2003

* cited by examiner

*Primary Examiner* — Ali Abyaneh
*Assistant Examiner* — Stephen Sanders
(74) *Attorney, Agent, or Firm* — Steven M. Greenberg, Esq.; CRGO Law

(57) ABSTRACT

An apparatus and a method provide a solution for a computer system. The apparatus may include a package containing or referencing a plurality of software components of the solution and containing a solution definition defining in logical terms the topology requirements of the solution. The plurality of software components may be packaged as installable units which comprise a descriptor providing requirements of a target hosting environment for the software component and the software component to be installed. The solution definition of the package may include target hosting environments of the software components of a solution being defined in terms of requirements each software component has on its own target hosting environment and requirements the solution imposes on the target hosting environments.

39 Claims, 7 Drawing Sheets

SOLUTION FOR A COMPUTER SYSTEM

BACKGROUND OF THE INVENTION

This invention relates generally to the field of computer systems, and more particularly, to describing and packaging complex solutions using multiple software components.

A software solution may be developed to solve a problem, such as a business problem, and may include resources installed in one or more computer systems. The resources cooperate with each other to provide the overall solution to the problem. Each resource may be provided by an appropriate software service within the computer system. For example, a database table is a resource which may be provided by a database management system. Thus a database management system is a software service which provides database table resources. Other resources can include executable applications and messaging queues.

BRIEF SUMMARY OF THE INVENTION

According to one aspect of the present invention, an apparatus for providing a solution for installation on a computer system comprises a package comprising a plurality of software components of the solution and a solution definition defining in logical terms the topology requirements of the solution.

According to another aspect of the present invention, a method for providing a solution for installation on a computer system comprises providing a plurality of software components of the solution, providing a solution definition defining in logical terms the topology requirements of the solution, and packaging the plurality of software components to the plurality of software components together with the solution definition.

According to yet another aspect of the present invention, a computer program product for providing a solution for installation on a computer system comprises a computer readable medium having computer readable program code embodied therein. The computer readable program code comprises computer readable program code configured to provide a plurality of software components of the solution, computer readable program code configured to provide a solution definition defining in logical terms the topology requirements of the solution, and computer readable program code configured to package the plurality of software components to the plurality of software components together with the solution definition.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
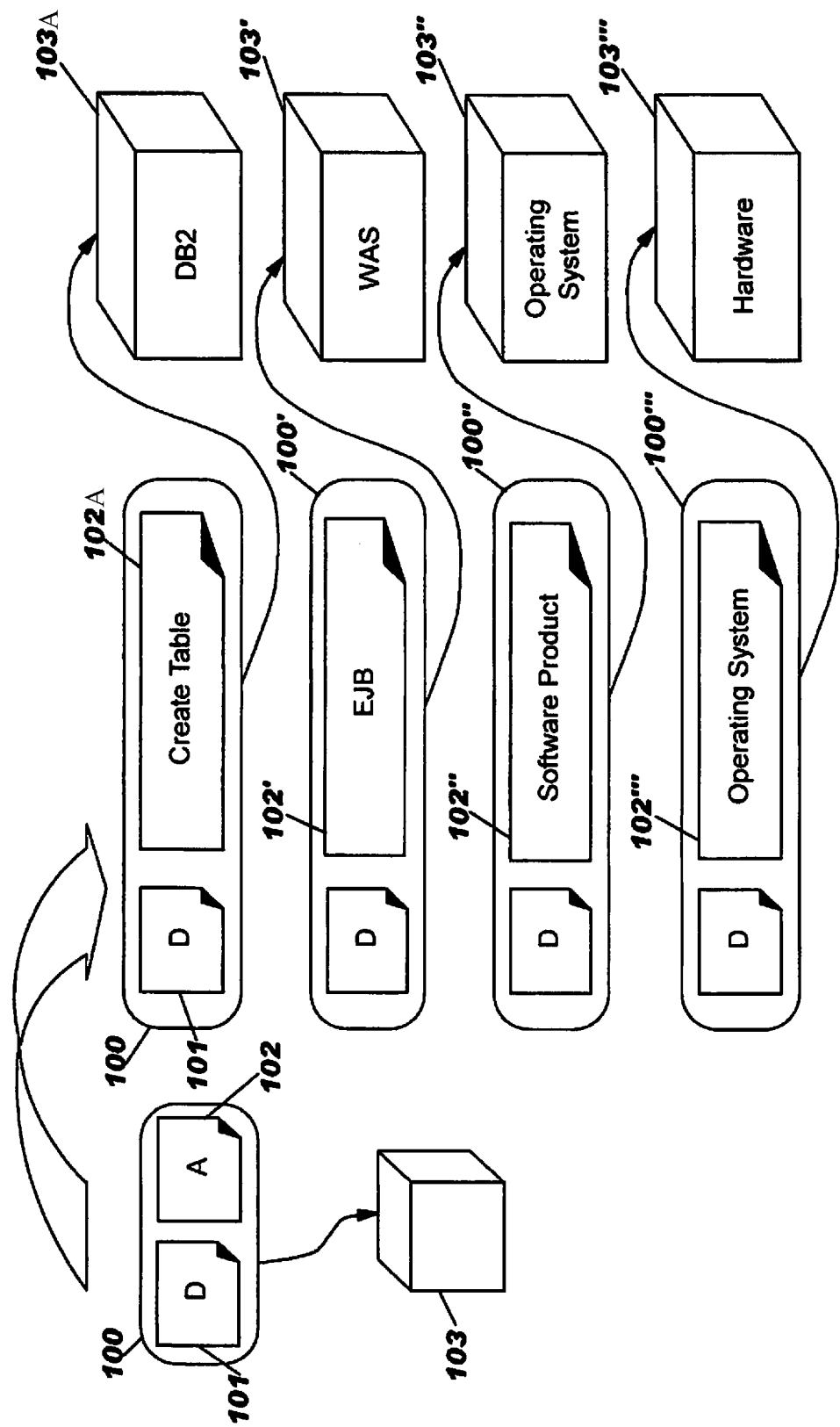
FIG. 1 is a schematic diagram of an installable unit and examples of installable units at different levels of a resource stack in accordance with an aspect of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In order to create a complex solution on a computer system, various software components may be installed. For example, an application built using enterprise Java beans (EJBs) (Java is a trademark of Sun Microsystems, Inc. in the United States, other countries, or both.) will require an application server, such as WebSphere application server WebSphere is a trademark of International Business Machines Corporation in the United States, other countries, or both), as well as the J2EE (Java 2 Platform, Enterprise Edition) application that contains the EJBs. In addition, initial data for these EJBs may need to be loaded into a database.

These components may install in different ways. Software components can be packaged into "installable units" which contain the "artifacts" (e.g. code) to be installed, together with an install descriptor containing the information needed to install it. An installer installs "installable units" into a target hosting environment, such as a LINUX operating system (trademark of Linus Torvalds) or Microsoft Windows operating system. LINUX is a trademark of Linus Torvalds in the U.S., other countries, or both and Microsoft and Windows are registered trademarks of Microsoft Corporation in the United States, other countries, or both. One part of the technique is the application of this design pattern at different levels of the software stack. For example, the installer installs a J2EE application into a J2EE application server, rather than into the operating system. To support this, the install descriptor describes the artifact to be installed and its install dependencies in a generic way, so that the installer can handle new types of installable units and new types of hosting environment without any changes to its logic.

In the above example of an application built using EJBs, there may be two artifacts—the EAR (Enterprise Archive) file containing the EJBs and a file containing the rows of the database table. The EJBs may be installed in a WebSphere application server, while the database table may be "installed" in a database. But more than that, the database may be the same one that is used by the WebSphere application server into which the EJBs are installed. The components may be packaged up together with the targets selected manually and passed to the installer.

The platform onto which the solution will be installed may be divided into a number of logical servers of predefined structure and name, each containing a number of hosting environments. For example, there is a business logic server (containing EJB servers, database, flow engines), and a user interaction server (containing HTTP server, web portal server). The solution package then contains the solution components together with information that specifies the targets in terms of these predefined logical servers. The install program then can locate the target servers in the physical system that correspond to those identified in the solution package—the individual components are then installed in the appropriate hosting environment within that logical server.

A software component to be installed is packaged as an installable unit, which contains the "code" to be installed, together with a descriptor containing the information needed to install it. Installable units (IUs) are installed not into the operating system, but rather into a corresponding target hosting environment. For example, for a J2EE application the installer knows that it is installing this into a WebSphere application server, rather than into the operating system.

FIG. 1 shows an installable unit (IU) 100 which is a package structure, for example, like a JAR (Java Archive) file with a descriptor and some collection of files. The IU 100 includes a descriptor 101 which describes the content of the IU and an artifact 102 that can be installed. The IU 100 is installed into an appropriate hosting environment 103 or container that can accept an artifact 102. In general, things that get installed or created can fit into the installable unit—hosting environment pattern.

This design pattern can be used at all levels of the resource stack as shown in FIG. 1. An artifact 102 can be any software component from a simple data file 102A, to an EJB 102', to a software product 102" to an operating system 102''' and, correspondingly, a hosting environment 103 can range from a database 103A in which a data file 102 is to be installed, an application server 103' on which the EJB 102' is to be installed, an operating system 103" on which the software product 102" is to be installed, to hardware 103''' on which an operating system 102''' is to be installed.

Figure 2:
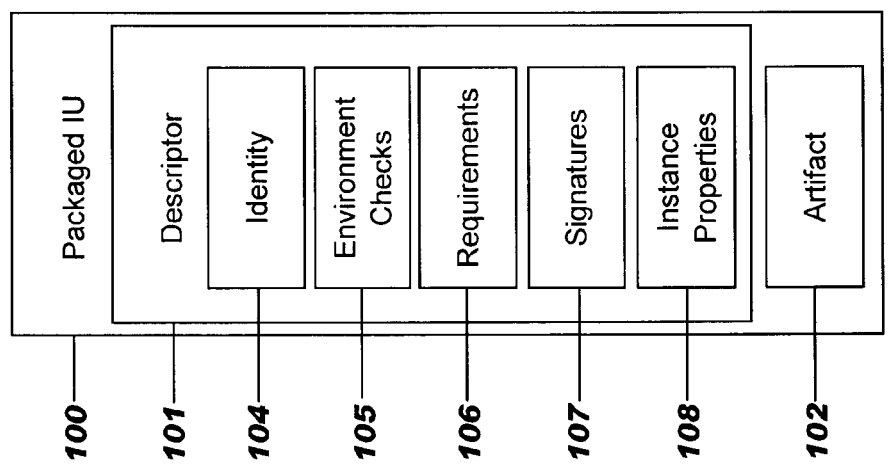
FIG. 2 is a block diagram of the contents of an installable unit shown in FIG. 1.

FIG. 2 illustrates one implementation of the concept of an installable unit 100. The descriptor 101 includes:

Identity 104—The unique identifier for this component including manufacturer, version, compatibility with other versions, etc.

Environment checks and Requirements 105, 106—These describe the required properties and conditions of the hosting environment for this component.

Signatures 107—These describe how to determine if an installable unit is installed.

Instance properties 108—Key properties relating to the install, such as install path, port number.

In prior solutions, dependencies can only be described in terms of properties of the operating system, such as disk space, memory capacity, etc, or using custom pieces of code that can perform checks on the target hosting environment and which are run via the operating system. When the installer knows the target hosting environment, these dependencies can be described in terms of properties of the target hosting environment. The relevant properties of the hosting environment need to be exposed to allow this, but this is once per hosting environment, rather than per installable unit and in many cases these will already be available through existing management interfaces.

The installer does not need to understand the internals of an artifact, simply the parameters that are required to install it. The descriptor provides all the information needed by an installer, leaving the artifact itself as an opaque object. The only responsibility that the installer has is to make it available to the install interface on the target hosting environment.

The installer program can implement a generic install mechanism that can be applied to any artifact type and any hosting environment. The hosting environment is responsible for knowing how to install its artifact types, and the component packaging no longer has to include anything to map the install to operating system commands.

This approach has the most value when the hosting environments all provide a common set of interfaces for install, uninstall, dependency checking and so on. Even without this, the fact that all things that must be deployed are described in a common way, with common description of their requirements their environment is still of value as it allows installers to reason about all artifact types in a common way.

The details of exactly what information is stored, or how, is not important to this disclosure. The descriptor might contain a single installable unit, or it might allow multiple installable units to be aggregated into a single package.

Figure 3:
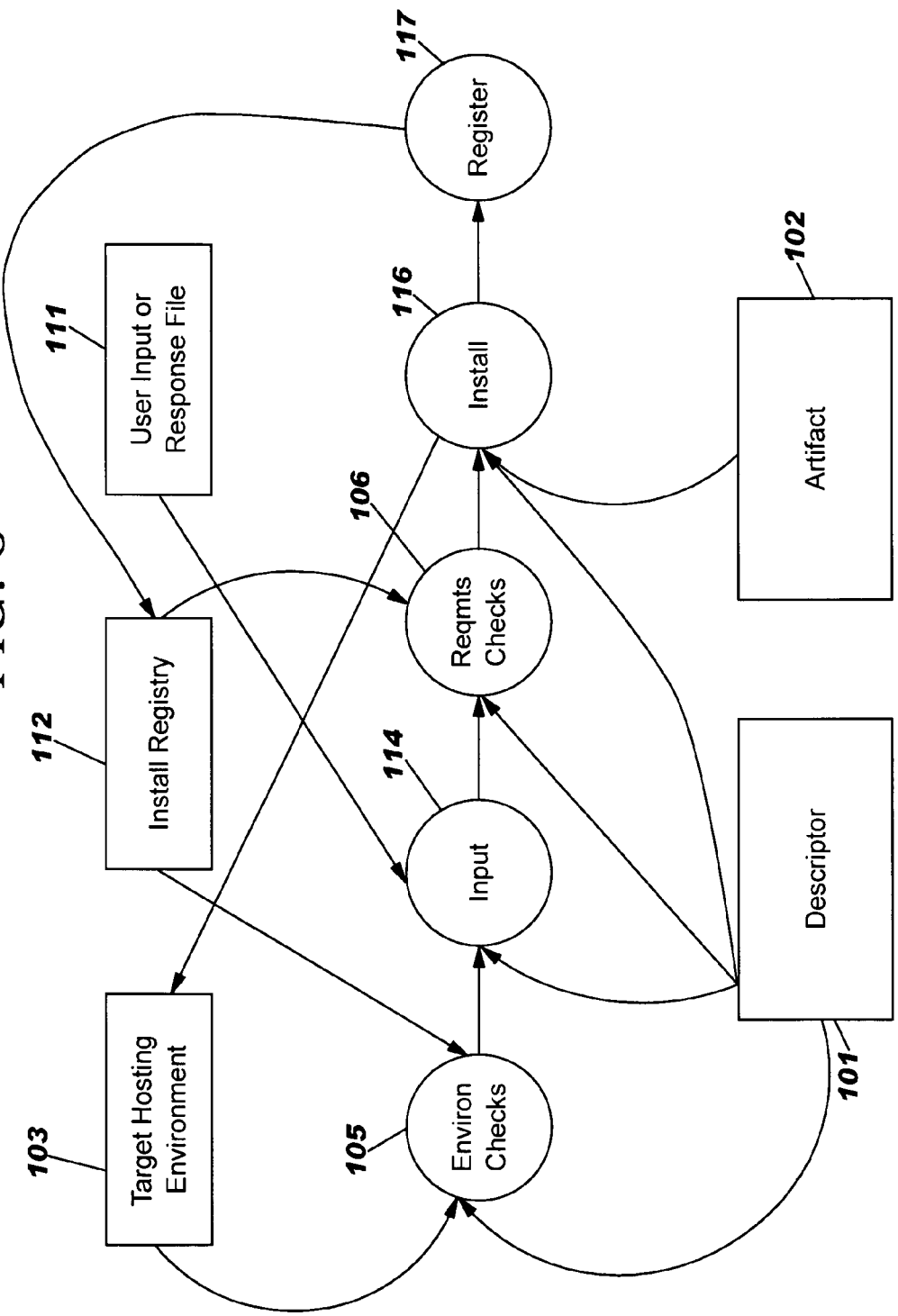
FIG. 3 is a diagram of the sequence of operations an installer may perform when installing an installable unit of FIG. 1.

FIG. 3 shows the sequence of operations that an installer may perform when installing an installable unit 100. The operations include an install registry 112, an environment checks 105, input 114, requirements checks 106, install 116 and register 117. The installer may choose the target hosting environment 103 by a number of different means, including:

The installer presents the user with a list of all hosting environments and lets them choose 111. This is sent to the input 114. In this case, it is possible for the user to select one that does not support the given artifact type.

The descriptor 101 identifies the type of the artifact 102. The installer looks in a registry of hosting environments to find one or more that says that it hosts the particular artifact type—i.e. the artifact can be installed in it. The installer can then allow the user to select one (or more) from this list.

The descriptor 101 includes dependencies that describe the required hosting environment. For example, the descriptor 101 might indicate that the target hosting environment 103 must be a J2EE application server. The installer can then use this to locate an appropriate target.

This descriptor 101 shows dependencies that apply to either the immediate hosting environment of the artifact, or the operating system on which that hosting environment sits (e.g. disk space). However, there is no reason why dependencies outside this scope should not be used. For example, the EAR file needs to be located on a WebSphere application server that is using a DB2 database, rather than any other type of database.

A description is now provided of the method and apparatus for describing and packaging solutions for a computer system. A mechanism is provided for describing the targets of a solution in terms of the requirements that each software component has on its own target hosting environment and also the requirements that the solution itself imposes.

Figure 4:
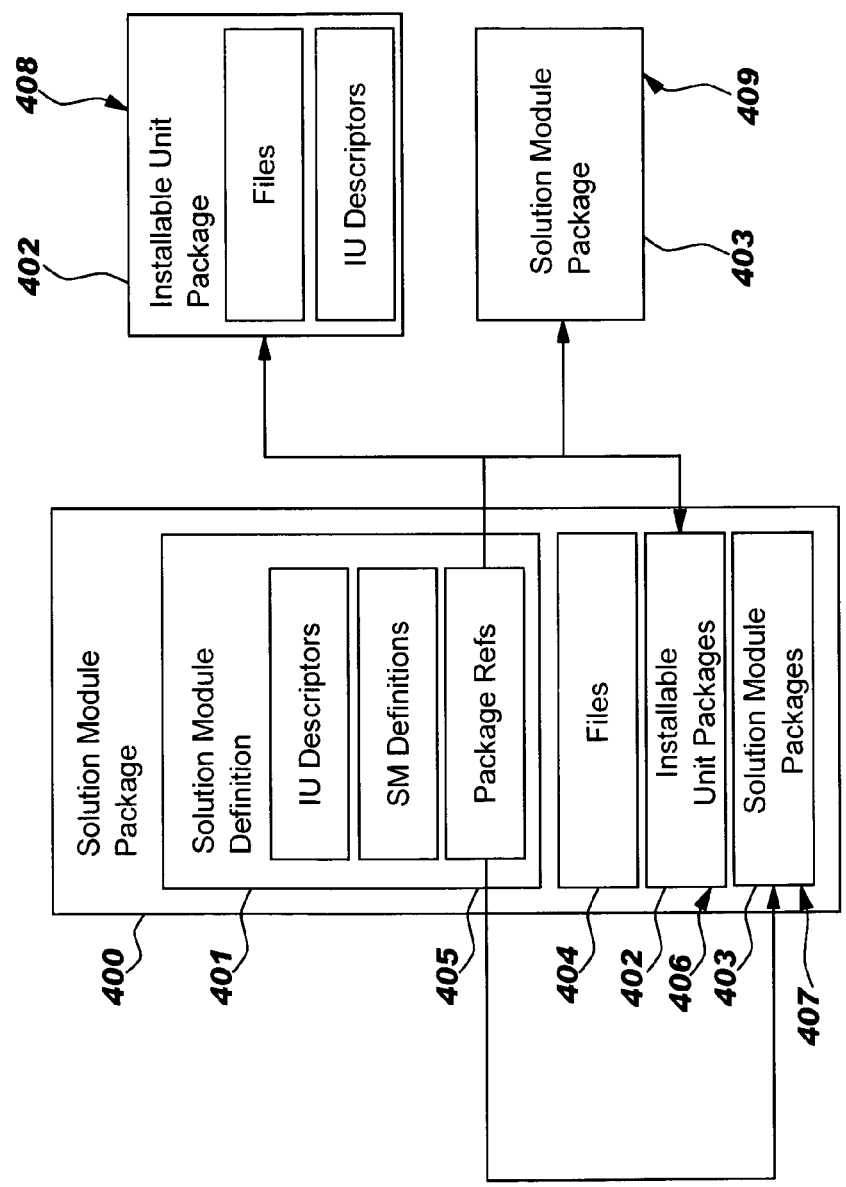
FIG. 4 is a block diagram of a solution module package in accordance with an aspect of the present invention.

Referring to FIG. 4, a solution module (SM) 400 is provided that packages up the installable units (IUs) that are the software components that comprise a solution, as well as a descriptor 401 of that solution. The descriptor 401 of the solution is referred to as the solution module definition (SMD).

FIG. 4 shows how a solution module 400 is composed from installable units, whether these are single target installable units 402 or other multi-target solution modules 403. The composed installable units may either be defined "in-line" 404 as part of a single solution module package 400, or there may be references 405 to separately packaged installable units. The referenced installable units may either be packaged within the solution module package 406, 407, or may be external packages 408, 409.

Figure 5:
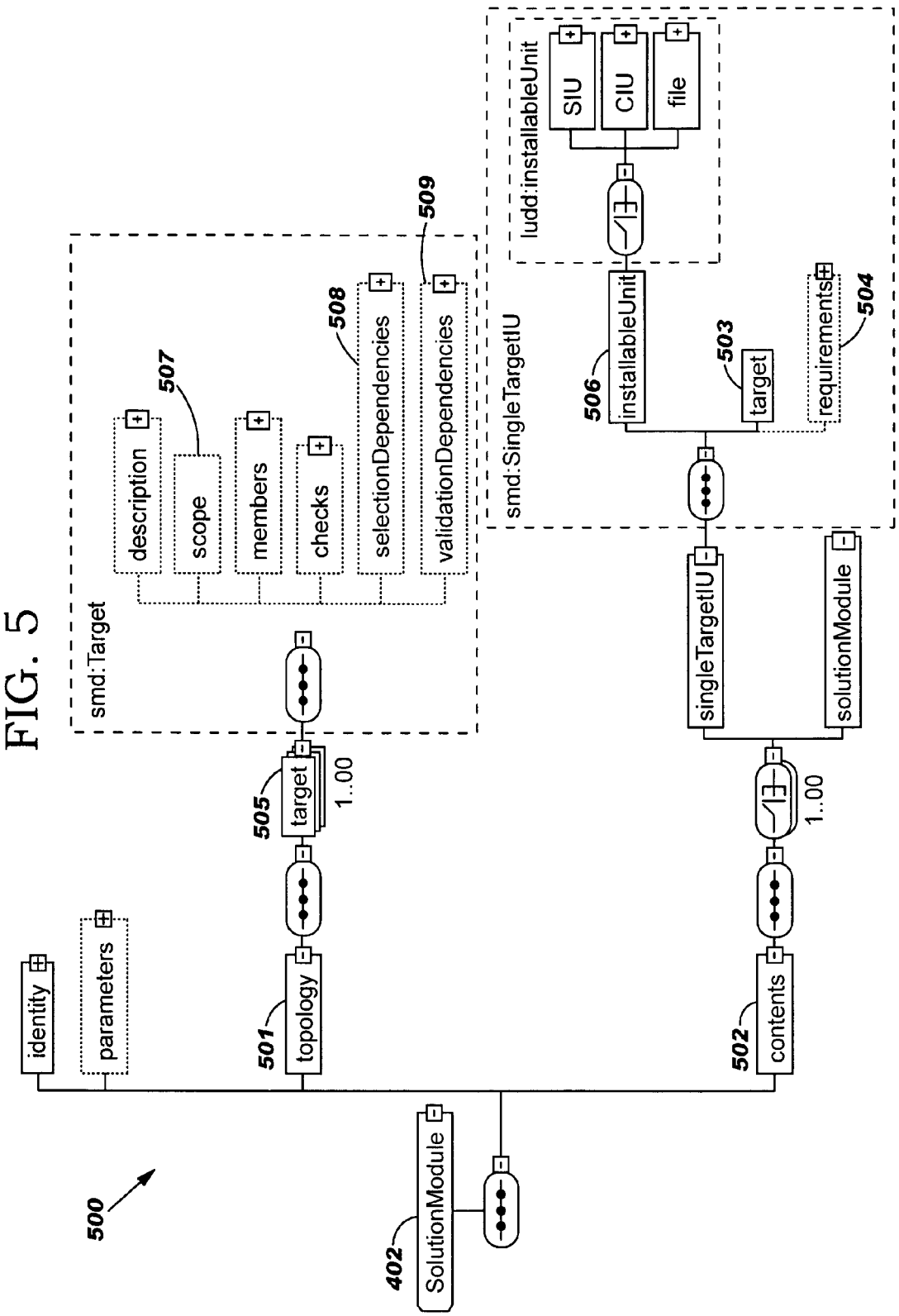
FIG. 5 is a top level structure of a solution module definition of a solution module package of FIG. 4.

FIG. 5 shows the top level structure 500 of the solution module definition 401. The two parts of this that are important to this description are the "topology" section 501 and the "target" 503 and "requirements" 504 of the "contents" section 502.

The target elements 505 within the topology section 501 together describe the logical topology onto which the solution should be deployed. This logical topology is specified in terms of the requirements on the target hosting environments within the topology, including the relationships between them. It is also possible that the requirements may involve manageable resources that are not themselves hosting environments but which are used to establish requirements on targets. For example, locating a database that already has a particular database table within it.

The target element 503 within the content section 502 points to one of the targets in the logical topology, and specifies the target hosting environment for the associated installable unit 506. It may describe additional requirements for the installable unit. These are solution-level requirements that override or add to the requirements already defined within the installable unit.

Characteristics of the logical topology definition include:

One logical target may be mapped to multiple physical targets. A target scope statement 507 defines whether a logical target should be mapped to one, some or all of the candidate targets.

Requirements on a logical target are divided into selection requirements 508, which are used to define a candidate list of targets; and validation requirements 509, which are used to validate the selected targets.

Each installable unit may specify additional requirements 504 on the relationships between targets, or on characteristics of a target, including its properties, status and contents (e.g. the software installed into it).

Figure 6:
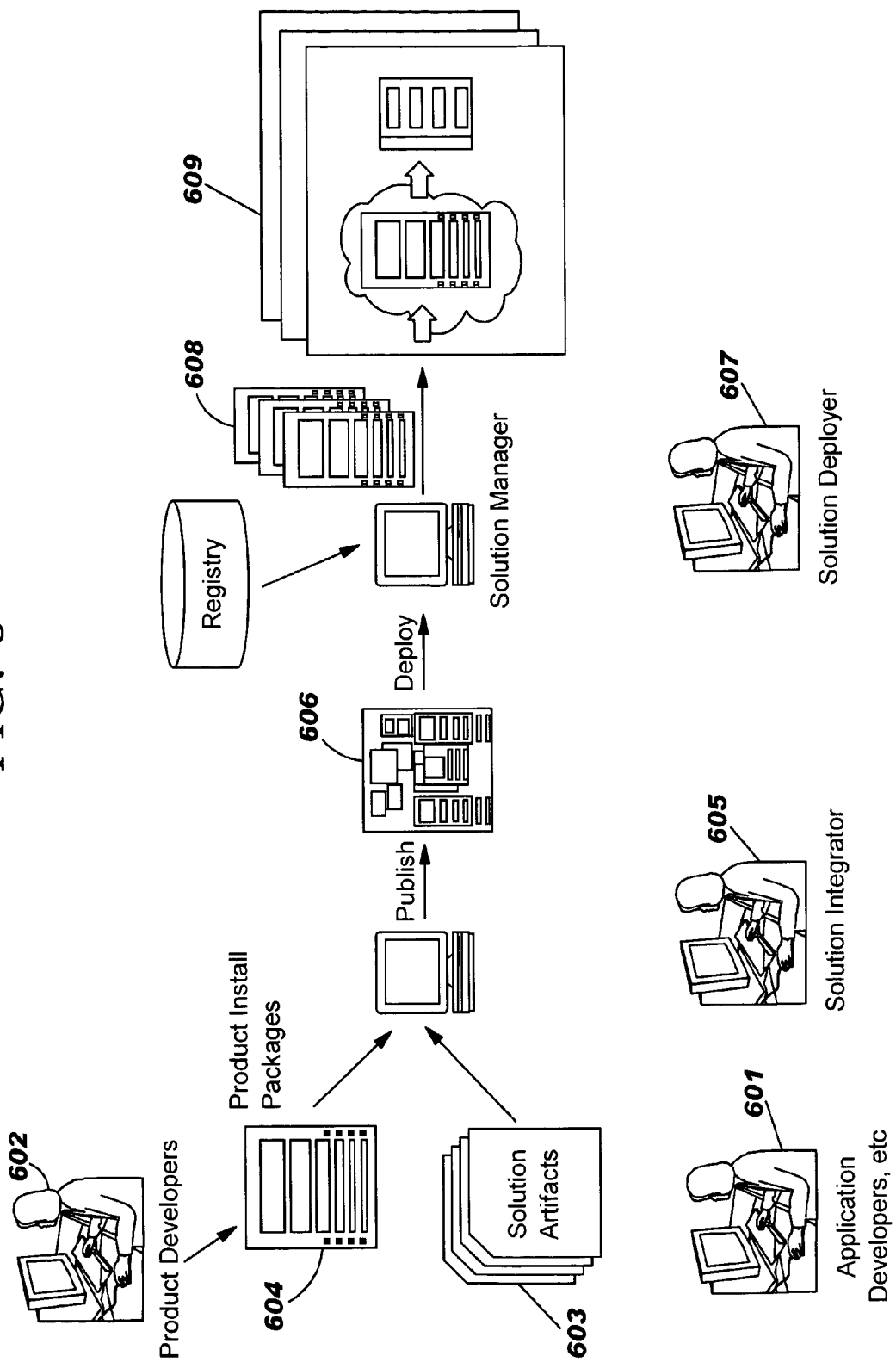
FIG. 6 is a schematic diagram of the overall process of developing and deploying a solution in accordance with an aspect of the present invention.

The overall process for developing and deploying a solution is described below with reference to FIG. 6. A solution is developed by application developers 601 and/or product developers 602. The application developers 601 create solution artifacts 603 which are integrated by a solution integrator 605 with product installation packages 604 developed by product developers 602.

The solution is then packaged as one or more solution module 606, at which point the logical topology is defined, and distributed to solution deployers 607. The solution deployer 607 makes installation-specific decisions about how the solution module is to be configured, and the solution deployment tooling assists in mapping the logical topology defined in the solution module onto the physical topology 608. The solution components (in the form of installable units) are then distributed and installed 609.

The described method focuses on the way the logical topology is described in the solution module definition, and its use during deployment. The main way in which the logical topology is used is to support automated assistance in selecting the physical targets onto which the solution is to be deployed. Manual installation can intervene if there is an ambiguity.

Figure 7:
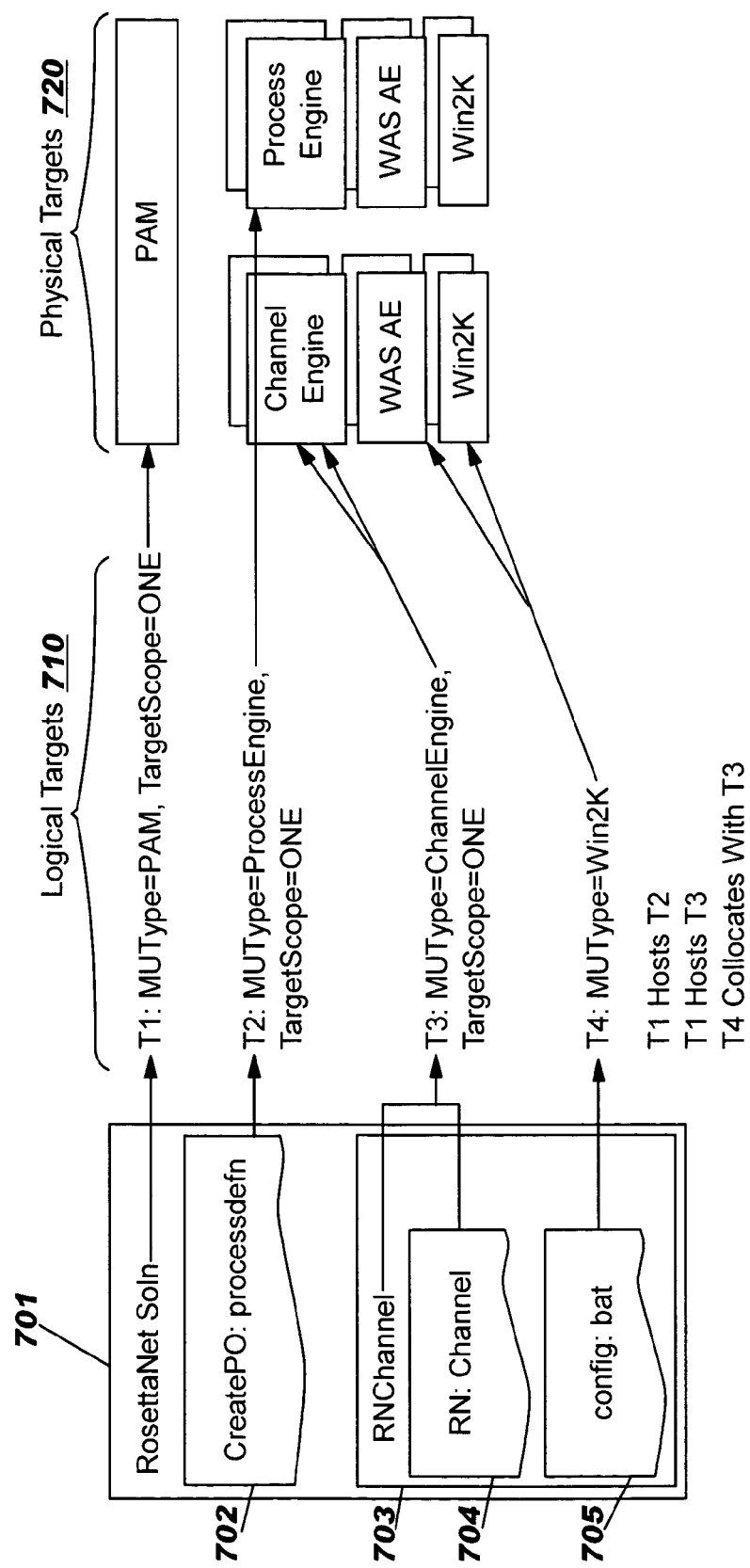
FIG. 7 is an example showing a solution module package and the mapping of a logical topology to a physical topology in accordance with an aspect of the present invention.

The characteristics of the way the logical topology may be mapped to a physical topology is illustrated in the following example with reference to FIG. 7. In this example, a solution 701 "RosettaNet Solution" consists of an installable unit 702 containing the "CreatePO" process definition, and an embedded solution module 703 containing a channel 704 and its configuration 705.

The elements of the logical topology 710 it is targeted at are:
- T1, the B2B Gateway (PAM), which hosts multiple channel engines and process engines;
- T2, one process engine within T1;
- T3, all of the channel engines within T1;
- T4, the operating systems on which the channel engines are located, which must be Windows 2K.

The logical targets 710 are mapped to physical targets 720. A possible high-level algorithm for deploying a solution module is as follows:

Select solution module.

Analyse contents. The input is the solution module definition. The output is a list of single-target installable units, their dependencies, and their targeting requirements.

Plan deployment. This results in a list of resolved targets, identifying which artifacts are to be deployed where.

Prepare for installation. The input is the list of installable units to be deployed, the dependency information and the target information. The output is a plan to be executed. This plan might be modified by the user, for example, to add scheduling information.

Install. The input is the deployment plan. Output will typically be returned asynchronously, and is the result of the installation.

The logical topology is primarily used in the "Plan deployment" step, in order to identify candidate targets. A possible algorithm for this is as follows:

Consolidate the complete set of logical topology requirements from the solution module and all embedded and referenced solution modules and installable units.

For each target in the logical topology
  Identify candidates that match the selection requirements on that target.
    This may require manual entry or selection of candidates, or an automated approach such as a search for matching targets in a registry.

For each target in the logical topology:
  If the scope is "all", select all of the candidates.
  Where there are multiple candidates and the target scope is "one" or "some", select from the list of candidates.
    This might be done by a user, or automatically in accordance with some algorithm or policy.
  If there are no candidates, this is an error.
  Check that the validation requirements are met.
For all embedded and referenced installable units, check that the requirements associated with that installable unit are satisfied by its resolved physical target(s).

The logical topology also supports defining solution parameters whose values are dependent on target characteristics, for example, properties or status. This addresses the problem of how to allow a solution to be configured in a context-sensitive manner. In a solution module, a parameter may be defined and associated with a property on a logical target. This parameter may then be used within the solution module, e.g. the parameter is associated with the property on a message queue that indicates which IP port the queue is receiving messages, and that is then used in the solution module when installing a component that will be sending messages to that queue.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A solution manager apparatus for providing a solution for installation on a computer system, comprising:
   a computer readable storage medium storing a package comprising:
      a plurality of software components of the solution and
      a solution definition describing a logical topology onto which the solution should be deployed, the logical topology including a target scope statement defining whether a logical target should be mapped to one, some, or all physical targets and requirements on the logical target; and
   an installation module executing in memory of a computer by a processor of the computer, the module during execution being configured to communicate the package from the computer readable storage medium to a solution deployer, wherein the logical targets in the logical topology are mapped into physical targets of the target hosting environments according to the target scope statement and the plurality of software components of the solution is deployed onto corresponding physical targets.

2. The apparatus as claimed in claim 1, wherein the plurality of software components are packaged as installable units comprising a descriptor providing requirements of a target hosting environment for the software component and the software component to be installed.

3. The apparatus as claimed in claim 1, wherein the solution definition comprises target hosting environments of the software components of the solution being defined in terms of:
   requirements each software component has on its own target hosting environment; and requirements the solution imposes on the target hosting environments.

4. The apparatus as claimed in claim 3, wherein the requirements the solution itself imposes on the target hosting environments comprise relationships between the target hosting environments.

5. The apparatus as claimed in claim 1, wherein the solution definition comprises logical topology specifying solution parameters whose values are dependent on characteristics of target hosting environments of software components.

6. The apparatus as claimed in claim 1, wherein the solution definition provides sufficient information for an algorithm to select appropriate physical resources in the computer system based on the logically defined topology requirements.

7. The apparatus as claimed in claim 1, wherein an algorithm deploys the solution automatically based on the solution definition.

8. The apparatus as claimed in claim 1, wherein an algorithm deploys the solution manually based on the solution definition.

9. The apparatus as claimed in claim 1, wherein the solution definition has a top level structure comprising target elements describing the logical topology onto which the solution should be deployed specified in terms of the requirements on the target hosting environments including the relationships between them.

10. The apparatus as claimed in claim 9, wherein the requirements comprise manageable resources which are used to establish requirements on target hosting environments.

11. The apparatus as claimed in claim 9, wherein the solution definition comprising the top level structure that comprises further target elements each associated with a software component which point to one of the logical targets in the logical topology and specify the target hosting environment for the associated software component.

12. The apparatus as claimed in claim 11, wherein the further target elements describe additional solution-level requirements for the software component that contribute to the requirements already defined in an installable unit for the software component.

13. The apparatus as claimed in claim 1, wherein the package comprises software components and references to other software components comprising the solution.

14. The apparatus as claimed in claim 1, wherein the software components are themselves solutions.

15. The apparatus as claimed in claim 1, wherein the package references the plurality of software components of the solution and the solution definition defining in logical terms the topology requirements of the solution.

16. The apparatus as claimed in claim 9, wherein the requirements are not hosting environments.

17. A method, within a solution manager apparatus, for providing a solution for installation on a computer system, the method comprising:
providing, within the solution manager apparatus, a plurality of software components of the solution;
providing, within the solution manager apparatus, a solution definition describing a logical topology onto which the solution should be deployed, the logical topology including a target scope statement defining whether a logical target should be mapped to one, some, or all physical targets and requirements on the logical target;
packaging, within the solution manager apparatus, the plurality of software components together with the solution definition to form a package;
mapping the logical targets in the logical topology into physical targets of the target hosting environments according to the target scope statement; and
deploying the plurality of software components of the solution onto corresponding physical targets.

18. The method as claimed in claim 17, further comprising packaging the plurality of software components as installable units, wherein the installable units comprise a descriptor providing requirements of a target hosting environment for the software component, and the software component to be installed.

19. The method as claimed in claim 17, wherein providing the solution definition defining in logical terms the topology requirements of the solution comprises defining target hosting environments of the software components of the solution in terms of:
requirements each software component has on its own target hosting environment; and
requirements the solution imposes on the target hosting environments.

20. The method as claimed in claim 19, wherein the requirements the solution itself imposes on the target hosting environments comprise relationships between the target hosting environments.

21. The method as claimed in claim 17, wherein providing the solution definition defining in logical terms the topology requirements of the solution comprises defining the logical topology by specifying solution parameters whose values are dependent on characteristics of target hosting environments of software components.

22. The method as claimed in claim 17, wherein providing the solution definition defining in logical terms the topology requirements of the solution comprises sufficient information for an algorithm to select appropriate physical resources in a computer system based on the logically defined topology requirements.

23. The method as claimed in claim 17, further comprising deploying the solution automatically using an algorithm based on the solution definition.

24. The method as claimed in claim 17, further comprising deploying the solution manually using an algorithm based on the solution definition.

25. The method as claimed in claim 17, further comprising providing the solution definition with a top level structure comprising target elements which in combination describe the logical topology onto which the solution should be deployed specified in terms of the requirements on the target hosting environments comprising the relationships between them.

26. The method as claimed in claim 25, wherein the requirements involve manageable resources which are used to establish requirements on target hosting environments.

27. The method as claimed in claim 25, further comprising providing the solution definition with the top level structure comprising further target elements each associated with a software component which point to one of the logical targets in the logical topology and specify the target hosting environment for the associated software component.

28. The method as claimed in claim 27, wherein the further target elements describe additional solution-level requirements for the software component that contribute to the requirements already defined in an installable unit for the software component.

29. The method as claimed in claim 17, wherein packaging the plurality of software components to the plurality of software components together with the solution definition comprises both software components and references to other software components comprising the solution.

30. The method as claimed in claim 17, wherein the software components that are contained or referenced are themselves solutions.

31. The method as claimed in claim 17, wherein the software components are references to software components.

32. The method as claimed in claim 25, wherein the requirements are not hosting environments.

33. A computer program product for providing a solution for installation on a computer system, the computer program product comprising:
   a non-transitory computer readable storage medium having computer readable program code embodied therein, the computer readable program code comprising:
   computer readable program code configured to provide a plurality of software components of the solution;
   computer readable program code configured to provide a solution definition describing a logical topology onto which the solution should be deployed, the logical topology including a target scope statement defining whether a logical target should be mapped to one, some, or all physical targets and requirements on the logical target;
   computer readable program code configured to package the plurality of software components together with the solution definition to form a package;
   computer readable program code configured to map the logical targets in the logical topology into physical targets of the target hosting environments according to the target scope statement; and
   computer readable program code configured to deploy the plurality of software components of the solution onto corresponding physical targets.

34. The computer program product as claimed in claim 33, further comprising computer readable program code configured to package the plurality of software components as installable units, wherein the installable units comprise a descriptor providing requirements of a target hosting environment for the software component, and the software component to be installed.

35. The computer program product as claimed in claim 33, further comprising computer readable program code configured to deploy the solution automatically using an algorithm based on the solution definition.

36. The computer program product as claimed in claim 33, further comprising computer readable program code configured to deploy the solution manually using an algorithm based on the solution definition.

37. The computer program product as claimed in claim 33, further comprising computer readable program code configured to provide the solution definition with a top level structure comprising target elements which in combination describe the logical topology onto which the solution should be deployed specified in terms of the requirements on the target hosting environments comprising the relationships between them.

38. The computer program product as claimed in claim 33, wherein the software components that are contained or referenced are themselves solutions.

39. The computer program product as claimed in claim 33, wherein the software components are references to software components.

* * * * *